US011248132B2

(12) United States Patent
Van Meulder

(10) Patent No.: US 11,248,132 B2
(45) Date of Patent: Feb. 15, 2022

(54) RADIATION CURABLE COMPOSITIONS FOR LOW GLOSS COATINGS

(71) Applicant: ALLNEX BELGIUM, S.A., Drogenbos (BE)

(72) Inventor: Guido Van Meulder, Sint Genesius Rode (BE)

(73) Assignee: ALLNEX BELGIUM, S.A., Drogenbos (BE)

( * ) Notice: Subject to any disclaimer, the term of this patent is extended or adjusted under 35 U.S.C. 154(b) by 0 days.

(21) Appl. No.: 15/754,667

(22) PCT Filed: Sep. 9, 2016

(86) PCT No.: PCT/EP2016/071297
§ 371 (c)(1),
(2) Date: Feb. 23, 2018

(87) PCT Pub. No.: WO2017/046008
PCT Pub. Date: Mar. 23, 2017

(65) Prior Publication Data
US 2018/0251642 A1 Sep. 6, 2018

(30) Foreign Application Priority Data
Sep. 15, 2015 (EP) .................................... 15185233

(51) Int. Cl.
*C09D 7/42* (2018.01)
*C09D 11/08* (2006.01)
*C09D 11/101* (2014.01)
*C09D 5/00* (2006.01)
*C09D 4/00* (2006.01)
*C09D 133/10* (2006.01)
*C08K 3/36* (2006.01)
*C08L 91/06* (2006.01)

(52) U.S. Cl.
CPC ................. *C09D 7/42* (2018.01); *C09D 4/00* (2013.01); *C09D 5/00* (2013.01); *C09D 11/08* (2013.01); *C09D 11/101* (2013.01); *C09D 133/10* (2013.01); *C08K 3/36* (2013.01); *C08L 91/06* (2013.01)

(58) Field of Classification Search
CPC ...... C09D 7/42; C09D 133/10; C09D 11/101; C09D 11/08; C09D 4/00; C09D 5/00; C08L 91/03; C08K 3/36
See application file for complete search history.

(56) References Cited

U.S. PATENT DOCUMENTS

| 2,416,074 | A | 2/1947 | Weber et al. |
| 6,399,672 | B1 | 6/2002 | Ceska et al. |
| 2008/0152829 | A1 | 6/2008 | Dean et al. |
| 2013/0101861 | A1* | 4/2013 | Cao ........................ C04B 41/483 428/451 |
| 2013/0131268 | A1* | 5/2013 | Buckmann ................ C09D 4/00 524/850 |

FOREIGN PATENT DOCUMENTS

| GB | 2134517 | 8/1984 |
| WO | 2011/098514 | 8/2011 |

OTHER PUBLICATIONS

Larranaga et al., Hawley's Condensed Chemical Dictionary, 16 ed., Wiley, p. 607-608 (Year: 2016).*
International Search Report dated Nov. 15, 2016 in International Application No. PCT/EP2016/071297.
Written Opinion of the International Searching Authority dated Nov. 15, 2016 in International Application No. PCT/EP2016/071297.

* cited by examiner

*Primary Examiner* — Jessica M Roswell
(74) *Attorney, Agent, or Firm* — Wenderoth, Lind & Ponack, L.L.P.

(57) ABSTRACT

The present invention relates to radiation curable coating composition (I) consisting essentially of: —from 20 to 95 wt % of one or more (meth)acrylated compounds (a), from 5 to 80 wt % of one or more metal salts of a C10 to C22 fatty acid (b), and—optionally, from 0 to 10 wt % of one or more additives (c), wherein the wt % of compounds (a) to (c) add up to at least 95%, preferably add up to 100%. Compositions of the invention are compatible with a whole range of radiation curable materials and with the standard additives like the standard matting agents. Compositions of the invention permit to obtain a dead matt effect using lower amounts of matting agents like silica and/or waxes. Dead matt effects can be obtained over a wide range of coating thicknesses.

12 Claims, No Drawings

RADIATION CURABLE COMPOSITIONS FOR LOW GLOSS COATINGS

FIELD OF THE INVENTION

The present invention relates to radiation curable compositions resulting in very matt (low gloss) coatings upon drying, to a process for preparing such compositions and to a coating obtained from such compositions. Compositions of the invention are suitable for making very matt coatings (low gloss) on various substrates such as wood, board, metal, stone, concrete, glass, cloth, leather, paper, plastics, films, foils (paper and/or plastic), foam and composites. The present invention also relates to inks, varnishes, adhesives and molded articles that are prepared with/from radiation curable compositions of the invention.

BACKGROUND OF THE INVENTION

Radiation curable coating compositions have long been used to produce coatings having certain desired coating characteristics. Low gloss coatings that produce less image impairment are often more pleasing aesthetically.

With conventional techniques such as solvent-borne or water-borne resin compositions a low gloss coating is easily achieved by adding small amounts of matting agents (for instance 1 to 5 wt % of silica).

In general, however, 100% UV radiation curable resin compositions are difficult to matt. There is typically no solvent or other diluent to evaporate and aid in the transport of the matting agents to the surface, so typically twice as much matting agent is required.

Often, in 100% UV radiation curable resin compositions more than 15 wt %, often more than 20 wt % of matting agents are required to obtain a low gloss, and even then it is very difficult to achieve gloss values below 15 at 60° angle. The result thereof is that the viscosity of the resin composition increases significantly. Very high viscosities can be detrimental to a good flow and to other desired properties.

Other disadvantages that result from high amounts of matting agents include coagulation of the composition resulting in a seedy appearance, an increased brittleness of the coating, and a settling out of the matting agents often resulting in an inconsistent mixing before application. The latter can lead to variations in gloss over the coating. Other downsides include a reduction in the general resistance and the performance of the coating. The change in general appearance can be measured as the change in gloss level of a coating. Very low gloss coatings are wanted for many market segments.

From cosmetic packaging to cars, smartphones and snack food packaging, consumer interest in matte finishes in growing. There is e.g. a big demand for very low gloss coatings in the wood (furniture, parquet, kitchens, construction) industry, as well as in the plastics, metal and concrete (consumer electronics, automotive, construction) industry and in the graphic arts (printing inks, overprint varnishes) industry.

EP2534208 (DSM) discloses low gloss coatings that contain C8-C20 mono-functional aliphatic alkyl (meth)acrylates. A high level of lauryl acrylate and octyl decyl acrylate (ODA) was found to have a negative impact on the resin's UV reactivity though, plus they induce a bad smell. Such compounds were further found to have a negative impact on performances like scratch and coin resistance etc.

U.S. Pat. No. 6,399,672 (SARTOMER) discloses radiation curable compositions for coatings, adhesives, inks and molded articles that contain oil-soluble metal-containing compounds. Standard zinc di(meth)acrylate is a solid fine white powder that can significantly reduce gloss of the coated and cured formulations (an effect that is not desired in U.S. Pat. No. 6,399,672). In contrast, the gloss of the coatings containing a soluble variant remained unchanged.

Heavy metal soaps exist since long (see e.g. U.S. Pat. No. 2,416,074, GB2134517). The term "heavy metal soap" covers a broad range of compounds with different uses. U.S. Pat. No. 2,416,074 describes the preparation of heavy metal salts of a variety of organic acid esters. Listed herein as organic acid esters used in the preparation of heavy metal soaps are: the esters of fatty acids of varying length, mono and polyesters of polycarboxylic acids, the esters of unsaturated acids and the esters of certain aromatic acids (column 2, lines 1-34). GB2134517 describes a process for the preparing of metal soaps of at least one aliphatic monocaboxylic acid. Again, various types of compounds of varying length are described (page 1, lines 45-60). There is no link in these documents to the matting of coating compositions, let alone 100% UV coating compositions. Vold and Hattiangdi (1949) list as possible uses of heavy metal soaps the manufacture of lubricating greases, the use as driers in paints, the use as flatting agents and the use as thickening agents for the production of jellied gasoline. No reference in this document to the use of heavy metal soaps in radiation curable materials.

An efficient and long lasting matting effect is not obtained with just any type of matting agent. 100% UV radiation curable resin compositions are not only difficult to matt, the results could not be predicted.

DESCRIPTION OF THE INVENTION

Against this background we now provide a radiation curable composition (I) consisting essentially of:
  from 20 to 95 wt % (percent by weight) of one or more (meth)acrylated compounds (a),
  from 5 to 80 wt % of one or more metal salts of a 010 to C22 fatty acid (b), and
  optionally, from 0 to 10 wt % of compounds (c) different from (a) and (b).

In the above, the wt % are relative to the total weight of the composition (I). Typically the wt % of (a)+(b)+(c) sum up to at least 95 wt %. In general the sum of their wt % is at least 97 wt %, preferably at least 98 wt %, more preferably at least 99 wt %. Most typically the wt % of compounds (a) to (c) sum up to 100 wt %. Of course this sum cannot exceed 100 wt %.

Compositions (I) of the invention are also referred to as "matt extenders" in the context of this invention. Matt extenders (I) of the invention can be mixed with the standard radiation curable materials and with other matting agents and generally provide a low gloss to the coating composition.

Advantages of the "matt extenders" (I) of the invention are:
  They have a low impact on the application viscosity,
  They have a minimal impact on other desired properties like flexibility, hardness, stain resistance, scratch resistance and/or sandability,
  They are temperature-stable,
  No high loads are needed to achieve a satin, matt or even a dead matt effect,
  They permit to obtain stable formulations having substantially the same gloss level after at least 3 month storage, They are compatible with polymers and matting agents commonly used in 100% UV applications, making them an ideal blending partner;

They are easy to matt compositions, giving the end user a certain flexibility of use, They are regulatory friendly as they are substantially free from VOC's, There is no to little yellowing, and/or The UV reactivity remains good.

Advantages of the radiation curable compositions (II) in which such "matt extenders" are used:

They in general have a low viscosity,

They provide a good stability (without sedimentation) when combined with standard matting agents, They permit to obtain gloss levels below 10, even below 5 at 60° angle, They even permit to obtain dead matt levels of 1-2 at 60° angle, They permit to obtain a stable gloss over a wide range of coating thicknesses, They in general combine a low gloss with a good UV curing activity, a good stain and a good scratch resistance, The most stringent regulatory requirements can be met because there is no absolute need for the addition of solvents or monofunctional monomers etc, They are easy to cure using UV light sources and/or electron beams, and/or They even allow UV-LED curing.

Provided in the invention is in particular a radiation curable composition (I) consisting essentially of:

from 50 to 95 wt % (percent by weight) of one or more (meth)acrylated compounds (a), from 5 to 50 wt % of one or more metal salts of a 010 to C22 fatty acid (b), and optionally, from 0 to 10 wt % of compounds (c) different from (a) and (b).

In one embodiment of the invention, no compounds (c) are present. In another embodiment of the invention, compounds (c) are present in the matt extender (I).

Without being bound by theory, it is believed that the metal soap (b) acts as a wetting agent that transports matting agents to the surface caused by an incompatibility during the gelation step. As a result, less supplemental matting agents are required to reduce the gloss level, and even an ultra-matte appearance is possible without loss of coating performance.

The chain length of the fatty acid was found to have an effect on both short term and long term matting effects (see e.g. Table 10 and the Comparative Data). Unlike compounds (b) of the invention, other wetting agents like ADDITOL™ wetting agents, DISPERBYK™ wetting agents or the like often had a minor impact on the lowering of the gloss and/or even increased the gloss. Compounds (b) of the invention have the advantage that they lower the gloss even without the addition of extra matting agents. In other embodiments, further matting agents are added to the radiation curable composition (II) of the invention to obtain a dead matt effect. By a "dead matt effect" is meant that the coating has such low gloss that it seems as if no coating is present at all. An advantage of compounds (b) of the invention is that less of the standard matting agents (like silica and/or waxes) are required to obtain the desired low gloss level.

The one or more compounds (a) typically comprise at least one (meth)acrylated oligomer. The (meth)acrylated oligomers are typically composed of only a few monomer units such as a dimer, trimer, tetramer etc. The use of one or more (meth)acrylated polymers is possible as well.

Examples of suitable compounds (a) include those selected from the group consisting of polyester (meth) acrylates, polyether (meth)acrylates, epoxy (meth)acrylates, amino (meth)acrylates, polycarbonate (meth)acrylates, (poly)urethane (meth)acrylates, (meth)acrylated (meth) acrylics, or mixtures thereof. Preferred are polyester (meth) acrylates, polyether (meth)acrylates and/or epoxy (meth) acrylates. Most preferred are polyester (meth)acrylates and/ or epoxy (meth)acrylates. By "(meth)acrylates" is meant to designate acrylates, methacrylates or mixtures thereof. Acrylates are generally preferred because of their higher UV reactivity.

Polyester (meth)acrylate oligomers are well known. These (meth)acrylated polyesters can be obtained by reacting a hydroxyl group-containing polyester backbone with (meth)acrylic acid, or by reacting a carboxyl group-containing polyester backbone with a hydroxyalkyl (meth)acrylate such as for example 2-hydroxyethyl acrylate, 2- or 3-hydroxypropyl acrylate, etc. or with glycidyl (meth)acrylate. The polyester backbone can be obtained in a conventional manner by polycondensation of at least one polyhydroxy alcohol, such as ethylene glycol, propylene glycol, butanediol, neopentyl glycol, hexanediol, trimethylolpropane, bisphenol A, pentaerythritol, etc, and/or the ethoxylates and/or propoxylates thereof, with at least one polycarboxylic acid or anhydride thereof such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones and/or polylactides can be used as polyester backbone. For example poly(ε-caprolactone), polylactide and/or poly(lactide, caprolactone) can be obtained by ring-opening polymerization of ε-caprolactone and/or lactide optionally in the presence of one or more polyhydroxy alcohols. Examples of suitable polyester (meth)acrylates include EBECRYL® 854, EBECRYL® 5849, EBECRYL® 450, EBECRYL® 452, EBECRYL® 657, EBECRYL® 810, EBECRYL® 852, EBECRYL® 853, EBECRYL® 870, and/or EBECRYL® 892 available from Allnex. Examples of oil-modified polyester (meth)acrylates that may be used are RAYLOK® 1621 and/or RAYLOK® 1622.

Polyether (meth)acrylate oligomers can be prepared by esterification of hydroxyfunctional polyethers with (meth) acrylic acid. Hydroxyfunctional polyethers can be obtained by ring-opening homo- or copolymerization of cyclic ethers such as tetrahydrofuran, ethylene oxide and/or propylene oxide, or can be prepared by reacting polyhydroxy alcohols with ethylene and/or propylene oxide.

Polycarbonate (meth)acrylate oligomers are also well known. They can be prepared by esterification of hydroxyfunctional polycarbonates with (meth)acrylic acid.

(Poly)urethane (meth)acrylate oligomers can be prepared by reacting a di- and/or polyisocyanate, such as hexamethylene-diisocyanate, isophorone-diisocyanate, toluene-diisocyanate, with hydroxyl functional (meth)acrylate. Use can be made exclusively of hydroxyl functional (meth)acrylates such as those mentioned above, but in order to extend the chain, mono- or polyhydroxy alcohols can also be added, such as those mentioned above for the synthesis of polyesters polyesters, polyethers or polycarbonates containing hydroxyl groups.

Examples of suitable urethane (meth)acrylates include EBECRYL® 264, EBECRYL® 265, EBECRYL® 4820 and/or EBECRYL® 4680, all available from Allnex. An example of a suitable aromatic urethane (meth)acrylates: EBECRYL® 210 and/or EBECRYL® 220, all available from Allnex.

By epoxy (meth)acrylate oligomers is meant to designate the (meth)acrylic esters of epoxides, preferably polyepoxides, i.e. compounds comprising at least one, preferably at least two epoxide functions. Epoxy (meth)acrylate oligomers are generally obtained from the esterification reaction of (meth)acrylic acid with epoxides. The epoxides are generally chosen from epoxidized olefins, glycidyl esters of saturated or unsaturated carboxylic acids, glycidyl ethers of aromatic or aliphatic alcohols or polyols and from cycloaliphatic polyepoxides. Preferred epoxides are diglycidylethers of aromatic and aliphatic diols and cycloaliphatic diepoxides such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of butanediol. Particularly preferred is diglycidyl ether of bisphenol-A. Also epoxidized natural oils or epoxidized phenol-formaldehyde copolymers can be used. Examples of natural oils include soybean oil, linseed oil, perilla oil, fish oil, dehydrated castor oil, tung oil, coconut oil, corn oil, cottonseed oil, olive oil, palm oil, palm kernel oil, peanut oil, sunflower oil, safflower oil, castor oil. Examples of suitable epoxy (meth)acrylates include EBECRYL® 600, EBECRYL® 648, EBECRYL® 645, EBECRYL® 860, EBECRYL® 6040, EBECRYL® 3700 and/or EBECRYL® 3203, all available from Allnex.

(Meth)acrylated (meth)acrylic oligomers can be obtained by first preparing a (meth)acrylic copolymer by copolymerization of (meth)acrylate monomers such as butyl acrylate with monomers containing pendant carboxylic acid, anhydride, hydroxy, glycidyl or isocyanate groups and by then reacting this copolymer with a monomer comprising at least one (meth)acrylate functional group and at least one carboxylic acid, anhydride, hydroxyl, glycidyl or isocyanate reactive groups. For example, a glycidyl group-containing copolymer can first be prepared by copolymerizing functionalized monomers such as glycidyl (meth)acrylate with other (meth)acrylate monomers, the said glycidyl group-containing polymer being usually reacted in a second step with (meth)acrylic acid. When the functionalized monomers are (meth)acrylic acid, the carboxyl group-containing polymer is generally reacted in the second step with glycidyl (meth)acrylate. An example of a suitable (meth)acrylated (meth)acrylic is EBECRYL® 1200.

Also amino (meth)acrylates can be added as such to the composition of the invention. Amino(meth)acrylates can be obtained by the addition reaction of a (meth)acrylate and an amine. Examples of suitable amino (meth)acrylates include EBECRYL® 7100, EBECRYL® 80, EBECRYL® 81, EBECRYL® 83, EBECRYL® 85, EBECRYL® 880, EBECRYL® LEO 10551, EBECRYL® LEO 10552 and EBECRYL® LEO 10553, all available from Allnex.

Compounds (a) typically are poly(meth)acrylates containing from 2 to 10 (meth)acryloyl groups per molecule. By "(meth)acryloyl groups" is meant acrylyol groups, methacryloyl groups or a mixture of both. More typically, compounds (a) comprise from 2 to 6 and most typically from 2 to 4 (meth)acryloyl groups. Acryloyl groups are herein preferred.

Compounds (a) may typically be defined as being composed of repeating monomer units and as having a molecular weight (MW) between 500 and 20,000 Daltons. The (meth)acrylate oligomers are preferably having a molecular weight of from 500 to 5,000 Daltons. Preferably compounds (a) have a number average molecular weight (Mn) of at least 300 Dalton and more preferably at least 500 Dalton. Often they have a Mn of at least 1,000 Dalton. Typically compounds (a) have a Mn of at most 20,000 Dalton, preferably at most 10,000 Dalton, more preferably at most 9,000 Dalton and even more preferably at most 8,000 Dalton. Number average molecular weights are herein determined by Gel Permeation Chromatography (GPC) at 25° C. using polystyrene standards and tetrahydrofuran (THF) as eluent. Preferably compounds (a) have a viscosity <50 Pa·s at a temperature of 25° C.

The one or more compounds (a) may also comprise at least one reactive monomer or diluent as well known in the art (see also infra). Often the one or more compounds (a) comprise at least one (meth)acrylated oligomer and at least one (meth)acrylated monomer. In embodiments, the (meth)acrylated monomers may be monofunctional, difunctional, or trifunctional, tetrafunctinal, pentafunctional or hexafunctional (meth)acrylate monomers. Representative examples of such monomers include but are not limited to: (meth)acrylic acid, ethylene glycol di(meth)acrylate, ethoxylated bisphenol A di(meth)acrylate esters, isosorbide di(meth)acrylate, tris(2-hydroxyethyl) isocyanurate tri(meth)acrylate as well as the di(meth)acrylate, alkyl (such as isobornyl, isodecyl, isobutyl, n-butyl, t-buyl, methyl, ethyl, tetrahydrofurfuryl, cyclohexyl, n-hexyl, iso-octyl, 2-ethylhexyl, n-lauryl, octyl or decyl) or hydroxy alkyl (such as 2-hydroxyethyl and hydroxy propyl) esters of acrylic acid or methacrylic acid, phenoxyethyl(meth)acrylate, nonylphenolethoxylate mono(meth)acrylate, 2-(-2-ethoxyethoxy)ethyl(meth)acrylate, 2-butoxyethyl(meth)acrylate, butyleneglycol di(meth)acrylate and tri(meth)acrylate, 1,6-hexanediol di(meth)acrylate, ethoxylated and/or propoxylated hexanediol di(meth)acrylate, tricyclodecanedi(meth)acrylate, tricyclodecanedimethanol di(meth)acrylate, pentaerythritol di(meth)acrylate and tri(meth)acrylate and tetra(meth)acrylate and the ethoxylated and/or propoxylated derivatives thereof, di-pentaerythrytol hexa acrylate (DPHA), propylene glycol di(meth)acrylate, neopentyl glycol di(meth)acrylate, ethoxylated and/or propoxylated neopentylglycol di(meth)acrylate, hexamethylene glycol di(meth)acrylate, 4,4'-bis(2-acryloyloxyethoxy)diphenylpropane, di- or trimethylolpropane tri(meth)acrylate and the ethoxylated or/and propoxylated derivatives thereof, phenylglycidylether (meth)acrylate, the (meth)acrylates obtained from the esterification with (meth)acrylic acid of aliphatic glycidyl ethers.

In an embodiment of the invention though, the coating composition (I) of the invention is substantially free from solvents and advantageously also substantially free from stenomeric (meth)acrylates.

Compounds (b), the at least one metal salt of a C10 to C22 fatty acid, are also known as metal soaps. Typically compounds (b) in the composition (I) are characterized by the Formula I:

$$M^{+n}(RCOCC^-)_n,$$

wherein M is one or more metal atoms, n is an integer in the range from 1 to 3, and R is the residue of these one or more C10 to C22 fatty acids (preferably C10 to C20 fatty acids).

Usually the fatty acid is a C12 to C22 fatty acid, often a C12 to C20 fatty acid. More preferably it is a C12 to C18 fatty acid, with C16 to C18 fatty acids being most preferred. By a "Cx to Cy fatty acid" is meant to designate a fatty acid that has from Cx to Cy carbon atoms in its alkyl chain. The fatty acid can be saturated or unsaturated, with mixes of both being possible. When unsaturated, then it is preferred that the fatty acid contains not more than 2 C=C double bonds, preferably not more than 1 C=C double bond. Preferred though are saturated fatty acids. The fatty acid can also be a hydrogenated fatty acid. Preferably the fatty acid is not a dimer fatty acid.

Particularly suited for use in the present invention are capric acid (decanoic acid, C10:0), lauric acid (dodecanoic acid, C12:0), myristic acid (tetradecanoic acid, C14:0), palmitic acid (hexadecanoic acid, C16:0), palmitoleic acid (C16:1), stearic acid (octadecanoic acid, C18:0), oleic acid (C18:1, cis), vaccenic acid (C18:1), elaidic acid (C18:1), arachidic acid (eicosanoic acid, C20:0), paullinic acid (C20:1), gondoic acid (C20:1), behenic acid (docosanoic acid, C22:0), coconut oil (mix of basically 010 to C18 oils), neodecanoic acid and/or carboxylic acids derived from hydrogenated oils (eg hydrogenated palm oil). Particularly preferred are palmitic acid (C16), palmitoleic acid (C16:1), stearic acid (C18), and/or oleic acid (018:1). More preferred are palmitic acid, stearic acid and/or oleic acid. Particularly preferred is stearic acid.

Suitable metals (M) include lithium, sodium, potassium, magnesium, calcium, barium, titanium, zirconium, vanadium, chromium, molybdenum, tungsten, manganese, iron, nickel, copper, zinc, boron, aluminum, gallium, silicon, antimony, bismuth, and the like. Preferred in the context of the invention are zinc, calcium, zirconium and/or bismuth. Preferred are in particular divalent metal atoms. Most preferred are zinc, calcium and/or zirconium because these gave the best solubility. They further permit to obtain long lasting dead matt effects.

Suitable compounds (b) include for instance zinc stearate (also known as zinc octadecanoate or zinc distearate), calcium stearate, zirconium stearate, natrium stearate, lithium stearate, aluminum stearate (also known as aluminum tristearate, ALUGEL™) zinc palmitate and/or bismuth neodecanoate. Particularly preferred are metal stearates. Preferred compounds (b) are e.g. zinc stearate, calcium stearate and/or zirconium stearate. Most preferred are zinc stearate and/or calcium stearate as these passed best the T° ageing test at 60° C. to 80° C. The particle size of the metal stearate used can be adapted in function of the end use, like for instance for inks and overprint varnishes, where metal stearates of finer size are preferred.

Advantageously compounds (b) are saturated compounds (id est, they advantageously are no ethylenically unsaturated compounds). Compounds (b) typically do not comprise any allyl, vinyl and/or (meth)acrylate groups. In particular compounds (b) according to the invention advantageously do not comprise any (meth)acrylate groups.

Often one or more additives are present in the matt extender (I) of the invention—compounds (c). In general compounds (c) are selected from one or more commonly used stabilizing additives. Examples of suitable additives (c) include but are not limited to heat stabilizers, defoamers, leveling agents, wetting agents, dispersing agents, anti-cratering agents, sedimentation inhibitors, UV absorbers, antioxidants and the like. In another or the same embodiment, compounds (c) may be selected from one or more matting agents different from (a) and (b). Examples thereof include but are not limited to the typical organic and/or inorganic matting agents like silica and/or waxes, but also other types of matting agents described like mono-functional C8-C20 alkyl (meth)acrylates (e.g. lauryl acrylate), zirconium ethyl hexanoate, etc.

Compounds (a) in the composition (I) are generally present in an amount from 50 to 95 wt % (percent by weight), typically in an amount from 60 to 95 wt %, more typically in an amount from 65 to 95 wt %, relative to the total weight of the matt extender (I). Preferably this amount is from 70 to 90 wt % and most preferably this amount is from 75 to 90 wt %. Preferably compounds (b) in the composition (I) are present in an amount from 5 to 50 wt % (percent by weight), typically from 5 to 40 wt % (percent by weight), more preferably in an amount from 5 to 35 wt %, relative to the total weight of the matt extender (I). Usually this amount is from 5 to 30 wt %, more typically it is from 5 to 25 wt % and most typically from 5 to 20 wt %. Often this amount is from 10 to 30 wt %, more typically it is from 10 to 25 wt % and most typically from 10 to 20 wt %. If more than 40 wt % of compounds (b) are being used, a gel can form, with a negative impact on the ability to mix well with the other ingredients though for some applications this may not be disturbing. At concentrations of (b) above 40 wt %, it may be beneficial to add a wetting and/or dispersing agent. Compounds (c) typically are present in an amount from 0 to 10 wt % (percent by weight), relative to the total weight of the matt extender (I). Usually their amount is at most 8 wt %, more typically at most 5 wt %. When present, typically they are used in an amount of at least 0.1 wt %, more typically at least 0.5 wt %. Most typical they are used in an amount from 0.1 to 3 wt %. In the above, any minimal amount cited above may be combined with any maximal amount cited.

Typically compositions (I) of the invention are non-aqueous radiation curable compositions (also referred as 100% radiation curable compositions). Typically the amount of solvents (including water) in this composition is at most 5 wt %, more preferably at most 3 wt %, most preferably at most 1 wt %, relative to the total weight of the composition (I). In general compositions (I) of the invention comprise less than 5 wt % of solvents. Usually no solvents are present in the compositions (I) of the invention, except for minor amounts of solvents that may be present due to the incorporation of additives (c).

Advantageously, a gloss level of at most 80, preferably at most 60, more preferably at most 50 and most preferably at most 45 is obtained at 85° angle. In general the 60° gloss level is at most 50 (satin). Preferred though are "dead matt" coatings with a 60° gloss level upon curing that typically is as most 15, preferably at most 10, more preferably at most 8 and most preferably at most 7. In some cases the 60° gloss level of the matt coating upon curing is at most 5, in particular cases it may even be as low as 1-2. The above gloss levels are for coatings that have a dry thickness (thickness after curing) of 12 μm. An advantage of using "matt extenders" (I) of the invention is that the above gloss levels can be obtained for a wide range of coating thicknesses. In general the above gloss levels can be obtained for coatings with a dry thickness of from 6 to 120 μm.

Compositions (I) of the invention are simple to make. Compounds (a), (b) and where present (c) can be simply mixed together and/or they can be added in steps, wherein the order of steps plays no role.

Compositions (I) of the invention are highly suitable for the making of matt (low gloss) coatings. In general the 85° gloss level of matt coatings that can be obtained with compositions (I) according to the invention is at most 80, preferably at most 60, more preferably at most 50 and most preferably at most 45. In general the 60° gloss level is at most 50 (satin). Preferred though are dead matt coatings with a 60° gloss upon curing that typically is as most 15, preferably at most 10, more preferably at most 8 and most preferably at most 7. In some cases the 60° gloss level of the matt coating upon curing is at most 5, in particular cases it can even be as low as 1-2. The above gloss levels are for coatings that have a dry thickness (thickness after curing) of 12 µm. An advantage of using matt extenders (I) of the invention is that the above gloss levels can be obtained for a wide range of coating thicknesses. In general the above gloss levels can be obtained for coatings with a dry thickness of from 6 to 120 µm.

An aspect of the invention of the invention relates to the use of a composition (I) of the invention for the making of low gloss (coating) compositions (II). Yet another aspect of the invention relates to a method for making a low gloss coating, said method comprising the steps of:
  (i) applying a coating composition prepared from a composition (I) of the invention to at least one surface of an article or a substrate,
  (ii) followed by a step of radiation curing the coating,
to give a matt coating having a gloss level of at most 50 at 60° angle and at most 80 at 85° angle, wherein the coating has a cured film thickness of 12 µm. In general, the gloss level at 60° angle is at most 15 and the gloss level at 85° angle at most 50 for coatings with a dry thickness (thickness after curing) of 12 µm. For more gloss levels that can advantageously be reached, see above. An advantage of the invention is that these gloss levels can be obtained over a wide range of coating thicknesses. In general they can be obtained for coatings with a dry thickness of from 6 to 120 µm, this without the absolute need for adding (further) matting agents like silica and/or waxes.

Typically though one or more (further) matting agents, different from compounds (b) an (c), are being added to a composition (I) of the invention. We noticed a synergistic effect between compounds (b) and standard matting agents (d) like silica and/or waxes, allowing even lower gloss levels to be obtained. By adding inorganic and/or organic matting agents (especially silica) matt levels below 10 at 60° angle are e.g. more easy to obtain.

Radiation curable matting compositions (II) of the invention therefore typically comprise at least one inorganic matting agent (d) and/or at least one organic matting agent (d) as well known in the art. Usually at least one inorganic matting agents is present. Particularly preferred are inorganic oxides and most preferred are silica particles.

The term "particle" is used here to refer to solid, either singularly or a collection thereof (e.g., powder) including spheroid(s), granule(s), fragment(s), or pieces(s) of matter having regular or irregular shape or surface. The term "inorganic oxides" is used to describe a binary compound of an element and oxygen and includes metal and semimetal oxides. Examples of such oxides may comprise $SiO_2$, $Al_2O_3$, $AlPO_4$, $MgO$, $TiO_2$, $ZrO_2$, $Fe_2O_3$ or mixtures thereof. Mixed inorganic oxides may be prepared by conventional preparation techniques, e.g. coblending, coprecipitating, cogelling etc. The oxides may be in a variety of forms, including gelled, precipitated, fumed, colloidal, etc. Inorganic oxides may also include natural minerals, processed/activated minerals, montmorillonite, attapulgite, bentonite, diatomite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

Standard inorganic matting agents (d) include silica (for example amorphous silicon dioxide), diatomaceous earth, talcum, chalk and waxes. Preferably the matting agent is selected from the group consisting of silica, diatomaceous earth, talcum, chalk and mixtures thereof. Silica is often preferred. The silica can be treated or untreated silica, or it can be a mixture of both. Examples of inorganic matting agents include ACEMATT™ 3300 (a pyrogenic silica), ACEMATT™ TS-100, ACEMATT™ TS-100/20, ACEMATT™ HK-400, ACEMATT™ HK-450, ACEMATT™ 3600, AEROSIL™ R-7200 and AEROSIL™ R-9200 available from Evonik Degussa; SYLOID™ ED5, SYLOID™ 162C, Syloid MX™ 306 and Syloid MX™ 309 available from W.R. Grace & Co; GASIL™ ED-5, GASIL™ 23D, GASIL™ 23F, GASIL™ 35M, GASIL™ HP-230, GASIL™ HP-270, GASIL™ HP335, GASIL™ HP380, GASIL™ 937, GASIL™ EBN, GASIL™ HP-880 and SILCRON™ G-602 from PQ Corporation, DEUTERON™ MK from Deuteron and CP4-8991 from Grace & Co.

Examples of suitable organic matting agents (d) include organic waxes such as (Methylenediaminomethylether-polycondensate) from Deuteron. CERAFLOUR™ 988 from BYK is an example of a micronized amide modified polyethylene wax matting agent. Other suitable examples include LANCO™ 1930 and LANCOWAX™ PP 1362D from Lubrizol, and SASOLWAX™ 5413 from Sasol.

Often a combination of at least one silica type and at least one organic wax is used. In a particular embodiment of the invention, compositions (II) hence comprise at least one inorganic matting agent (d) and at least one organic matting agent (d).

The type of matting agent can be chosen to suit the final application. For instance when GASIL™ 23D is used, a matt film is obtained with high transparency. But when GASIL™ UV-70C and/or ACEMATT™ 3300 are used, matt films are obtained with low transparency. In general the amount of mono-functional (meth)acrylates, in particular the amount of mono-functional alkyl(meth)acrylates, more in particular the amount of C8-C20 mono-functional alkyl(meth)acrylates (like lauryl acrylate) is kept well below the level of 10 wt % (percent by weight), preferably below the levels of 8 wt %, more preferably below the level of 5 wt %, relative to the total weight of the composition (II). In an embodiment of the invention, no mono-functional C8-C20 alkyl(meth) acrylates like lauryl acrylate are present, as they can have a negative impact on smell, UV reactivity and performances.

Typically matting compositions (II) of the invention comprise from 0 to 20 wt % (percent by weight) of matting agents (d), relative to the total weight of the composition (II). When present, their amount in the matting composition (II) typically is from 0.1 to 15 wt %, usually from 0.5 to 10 wt %, preferably from 0.75 to 9 wt % and most preferably from 1 to 8 wt %, relative to the total weight of the composition (II). Any minimal amount cited above may be combined with any maximal amount cited above. For instance, the amount of matting agents (d) in the composition may be from 0.1 wt % to 20 wt % or less, or from 0.5 wt % or more to 8 wt % or less.

An advantage of the compositions of the invention is that lower amounts of matting agents (d) like silica and/or waxes are needed than standardly required in the art, which has a positive impact on the stability of the composition. The compositions of the invention permit to obtain matt coatings with practically no gloss change over a wide range of coating thicknesses. When combined with low levels of matting agents (d), low gloss values can be obtained without loss of formulation flexibility or performance.

In general the formulator will use the "matt extender" (I) of the invention in an amount from 2 to 50 wt % (percent by weight), typically from 5 to 40 wt %, typically from 10 to 40 wt %, more typically from 15 to 30 wt %, and most typically from 15 to 25 wt %, relative to the total amount of the composition (I). Any minimal amount cited above may be combined with any maximal amount cited above.

Typically matting compositions (II) of the invention as such comprise from 0.1 to 40 wt % (percent by weight) of metal soaps (b), relative to the total weight of the composition (II) of the invention. Their amount in the matting composition (II) typically is from 0.1 to 20 wt %, usually from 0.1 to 15 wt %, preferably from 0.5 to 10 wt % and most preferably from 1 to 8 wt %, relative to the total weight of the composition (II). Any minimal amount cited above may be combined with any maximal amount cited above. For instance, the amount of matting agents (d) in the composition may be 1 wt % or more and 10 wt % or less.

Usually the end user will further add one or more (meth)acrylated compounds (e), which may be the same or may be different from the (meth)acrylated compounds (a) that are mentioned above. Usually at least one (meth)acrylated oligomer (e) is added, the choice and the amount of these compounds depending upon the end properties that are desired. Examples of suitable (meth)acrylated oligomers are the same as listed above for compounds (a).

Reactive diluents (e) may be added to the "matt extender" (I) to reduce the viscosity of the matting composition (II). Reactive diluent used in the context of the invention typically contain at least one active energy ray curable group, more in particular at least one (meth)acryloyl group, allyl group and/or vinyl group. Preferred are vinyl and/or (meth)acryloyl groups. Most typical are (meth)acryloyl groups and in particular acryloyl groups. Suitable vinyl compounds include styrene, [alpha]-methylstyrene, vinyl toluene, bromostyrenes, tert-butylstyrene, N-vinylpyrrolidone, N-vinylcaprolactam, N-vinylformamide, vinyl acetate, vinyl propionate, vinyl pivalate, vinyl stearate, vinyl 2-ethylhexanoate, methyl vinyl ketone, ethyl vinyl ketone, vinyl ethers of C1-C20 alcohols, 2,3-dihydrofuran, vinyl(meth)acrylate, allyl vinyl ether, and divinyl ether of C1-C20 diols, for example. Suitable (meth)acrylated compounds include butyl (meth)acrylate, methyl(meth)acrylate, isobutyl(meth)acrylate, 2-ethylhexyl(meth)acrylate, cyclohexyl-(meth)acrylate, n-hexyl(meth)acrylate, isobornyl(meth)acrylate, iso-octyl-(meth)acrylate, n-lauryl-(meth)acrylate, octyl/decyl (meth)acrylate, 2-hydroxyethyl(meth)acrylate, phenoxyethyl-(meth)acrylate, nonylphenolethoxylate mono (meth)acrylate, 2-(-2-ethoxyethoxy)-ethyl-(meth)acrylate, 2-butoxyethyl(meth)acrylate, 1,6-hexanediol di(meth)acrylate (HDD(M)A), di or tri propylene glycol di(meth)acrylate (DPGD(M)A, TPGD(M)A), ethoxylated and/or propoxylated neopentylglycol di(meth)acrylate, pentaerythritol tri (meth)acrylate (PETI(M)A) and the ethoxylated and/or propoxylated derivatives thereof, trimethylolpropane tri (meth)acrylate (TMPT(M)A) and the ethoxylated and/or propoxylated derivatives thereof, di-trimethylolpropane tri (meth)acrylate (diTMPT(M)A) glycerol tri(meth)acrylate, di-pentaerythrytol hexa acrylate (DPHA) and the ethoxylated and/or propoxylated derivatives thereof, dianhydrohexitols di(meth)acrylates (like isosorbide di(meth)acrylate) and the ethoxylated and/or propoxylated derivatives thereof, bisphenol A di(meth)acrylate and the ethoxylated and/or propoxylated derivatives thereof, phenylglycidylether (meth)acrylate and the ethoxylated or/and propoxylated derivatives thereof, the (meth)acrylates obtained from the esterification with (meth)acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain comprises from 6 to 24 carbon atoms, more preferably from 8 to 18 carbon atoms.

Preferred are di and/or tri(meth)acrylated monomers such as 1,6-hexanediol di(meth)acrylate (HDD(M)A), di or tri propylene glycol di(meth)acrylate (DPGD(M)A, TPGD(M)A), trimethylolpropanetri(meth)acrylate (TMPT(M)A) and the ethoxylated and/or propoxylated derivatives thereof, pentaerythritoltri(meth)acrylate (PETI(M)A) and the ethoxylated and/or propoxylated derivatives thereof, glyceroltri(meth)acrylate and the ethoxylated and/or propoxylated derivatives thereof, dianhydrohexitols di(meth)acrylates (like isosorbide di(meth)acrylate) and the ethoxylated and/or propoxylated derivatives thereof, bisphenol A di(meth)acrylate and the ethoxylated and/or propoxylated derivatives thereof. In an embodiment of the invention at least one di and/or tri(meth)acrylated monomer is present in the radiation curable matting composition (II) of the invention. It is preferred to keep the amount of mono-functional (meth)acrylates, in particular of mono-functional alkyl (meth)acrylates, more in particular the amount of C8-C20 mono-functional alkyl(meth)acrylates (like lauryl acrylate) well below the level of 10 wt % (percent by weight), preferably below 8 wt %, more preferably below 5 wt %, relative to the total weight of the matting composition (II) of the invention. In an embodiment of the invention, no mono-functional (meth)acrylates are present at all. In another preferred embodiment of the invention substantially no stenomeric (meth)acrylate monomers are present, in casu added, at all.

Reactive diluents typically are monomers. Preferably the viscosity of reactive diluents used is in the range of from 5 mPa·s to 2 Pa·s at a temperature of 25° C. and most preferably it is <500 mPa·s. Preferably the reactive diluents used have a number average molecular weight (Mn) in the average range of from 100 to 1000 Daltons, more preferably 200 to 800 Daltons and most preferably 200 to 500 Daltons. Typically the weight average molecular weight (MW) is at most 1000 Daltons.

Typically the total amount of (meth)acrylated compounds present in the matting composition (II) of the invention is from 40 to 95 wt % (percent by weight), relative to the total weight of the composition. Their amount in the matting composition (II) typically is from 50 to 90 wt %, usually from 60 to 85 wt %, preferably from 70 to 80 wt % and most preferably from 75 to 80 wt %, relative to the total weight of the composition (II). Any minimal amount cited above may be combined with any maximal amount cited above.

The chemistry of the matte extender (I) of the invention makes it possible to achieve a wide range of lower gloss levels, including ultra-low ("dead matt") gloss levels of <5 at 60°, without the absolute need to add any solvents or monofunctional (reactive) diluents.

The composition of the invention may contain other conventional ingredients (f) including coalescing organic solvents, pigments, dyes, heat stabilizers, defoamers, leveling agents, anti-cratering agents, fillers, sedimentation inhibitors, UV absorbers, antioxidants and the like introduced at any stage of the preparation process or subsequently.

The composition of the invention advantageously is liquid and preferably has an application viscosity below 5,000 mPa·s, often below 4,000 mPa·s, more preferably below 2,000 mPa·s at a temperature of 25° C.

The low viscosity makes it very easy to incorporate the matt extender (I) of the invention into coating formulations. The matt extender (I) is compatible with polymers and matting agents commonly used in 100% UV applications, making them an ideal blending partner with e.g. urethane (meth)acrylates, polyester (meth)acrylates, epoxy (meth)acrylates, (meth)acrylated (meth)acrylics etc.

The compositions of the invention are particularly useful as coating compositions, or for providing the principle component of coating compositions (e.g. protective or decorative coating compositions), for which purpose they may be further diluted with volatile organic solvents. The formulation can contain solvents but is preferentially solvent-free.

The volatile organic solvent that can be used can be an aliphatic or an aromatic hydrocarbon such as SOLVESSO™ 100(R), a mixture of aromatic solvents having an aromatic solvent content of 99.5% by weight and comprising primarily C9-10 dialkyl and trialkyl benzenes. Also suitable are toluene or xylene, alcohols such as n-butanol or isopropanol, esters such as isobutyl acetate, n-butyl acetate, n-propyl acetate, methyl acetate or ethyl acetate, ketones such as acetone, methyl isobutyl ketone or methyl ethyl ketone, ethers, ether-alcohols or ether-esters such as ethyl 3-ethoxy-propionate, propylene glycol methyl ether, propylene glycol ethyl ether, propylene glycol n-propyl ether or propylene glycol t-butyl ether or a mixture of any of these. The level and type of solvent used will depend on the viscosity of the other components and the intended application method.

Preferably however, the composition (II) of the invention comprises at most 50 wt % (% by weight), more preferably at most 20 wt %, most preferably at most 5 wt % and especially at most 0.5 wt % of organic solvents (including water). Usually the composition of the invention is free from volatile organic solvents, except from some minimal amounts that are present due to the incorporations of additives some of which are supplied in a solvent.

Often wetting agents (g) other than the metal soaps (b) are added. An example thereof, are substrate wetting agents. Such wetting agents (e), when present, typically are present in an amount of at most 3 wt % (% by weight), relative to the total weight of the composition. Usually this amount is at most 2 wt %, most preferably at most 1 wt %.

Matting compositions (II) of the invention in general are easy to cure, using the full spectrum of UV or other suitable means. Matting compositions (II) of the invention can for instance be cured under natural outdoor light, via electron beams, by ultraviolet (UV) lamp radiation and/or by peroxide curing. A coating that is prepared from matting compositions (II) of the invention in general dries quickly, is sandable and has good chemical resistance Also curing by LED light is possible. The UV-light sources typically emit at wavelengths between 200 and 800 nm, yet an advantage of the present invention is that curing with UV LED light sources is possible, which typically emit in a spectrum with the strongest wavelengths in the range of from 365 to 395 nm.

Most typical though is curing by UV light radiation. The curing can be with or without the use of photoinitiators. Typically though, matting compositions (II) of the invention comprise at least one photoinitiator. Any photoinitiator and mixtures thereof capable of generating free radicals when exposed to radiation may be used. Preferred photoinitiators include IRGACURE™ 184; acyl phosphine oxides, for example IRGACURE™ 819; or benziketals such as IRGACURE™ 651, available from BASF, ADDITOL® BP (a benzophenone) available from Allnex, and IRGACURE™ 1173 or IRGACURE™ BP (a benzophenone) available from BASF. When present, the amount of photoinitiators in a matting composition (II) of the invention is typically from 0.01 to 10 wt % (% by weight), more preferably from 1 to 8 wt %, most preferably from 3 to 5 wt % of at least one photoinitiator, relative to the total weight of the composition.

Another aspect of the invention relates to a process for making a matting composition (II) of the invention, said process comprising the steps of:
(i) Providing a "matt extender" (I) as described above (any of the above) or the ingredients thereof,
(ii) Adding mattings agents (d) in the respective amounts,
(iii) Optionally adding further (meth)acrylated compounds in the respective amounts, and
(iv) Optionally, adding additives and/or solvents in the respective amounts, wherein steps (i), (ii), (iii) and (iv) may be in any order. Before application onto a substrate, one or more photoinitiators may be added (v).

Lowering the viscosity of the composition (II) may help to obtain a matt finishing. As such the above method may further comprise a step (vi) of:
(via) adding reactive diluents like DPGDA, HDDA, ODA etc, and/or
(vib) increasing the temperature of the matting composition (II) to a temperature of at least 25° C., preferably at least 30° C., possibly at least 50° C. and typically not more than 60° C., this prior to cure.

The temperature of the matting composition (II) may be increased by installing an IR-lamp that heats the surface to be coated prior to UV cure. Raising the temperature as indicated above has the further advantage that the metal soap(s) (b) will migrate faster and more smoothly to the coating surface with positive impact on the matt finish obtained.

After a step of curing by radiation advantageously a matt coating is obtained with a gloss level of at most 15 at 60° angle and at most 50 at 85° angle at a cured film thickness of 12 μm.

Matting compositions (II) of the invention may be applied to a variety of substrates including wood, board, metal, stone, concrete, glass, cloth, leather, paper, plastics, films, foils (paper and/or plastic), foam, composites and the like, by conventional methods including brushing, dipping, flow coating, spraying, roller, curtain coating and the like. They are particularly useful for providing coatings on wood, paper, plastic and board substrates. They are in particular useful for the coating of resilient flooring (PVC), consumer plastics (ABS, PMMA, PC, PP, . . . ) and foils (PET, PVC, PP, PE, . . . ). Compositions of the invention are further in particular suited for use in or on kitchen & bathroom cabinets, furniture, flooring, consumer electronics, automotive applications, graphic applications (including flexo, offset, screen and inkjet printing inks, but also overprint varnishes on paper & board, on plastic films like PE, PET, PP etc). They are particularly suited for use in the wood (furniture, parquet, kitchens, construction) industry, as well as in the plastics, metal and concrete (consumer electronics, automotive, construction, concrete protection) industry and in the graphic arts (printing inks, overprint varnishes) industry.

Compositions of the invention are also suited for field applied applications on a wide variety of flooring substrates like wood, plastic, concrete, composites such as MDF, plastic-wood composites for decks and terrazzo, resilient flooring such as VCT, vinyl, linoleum, PVC, rubber and cork. They are also suitable for field applied applications on vertical substrates especially for trim coating such as the coating of window frames, doors, shutters, fences, timbers etc. Other suitable substrates are paper foil substrates.

They are further also suited for use in matte and ultra-matte finishes for high-end electronics (e.g. cell phones, tablets) and luxury packaging or advertising material, food packaging, cosmetic packaging etc.

The compositions according to the invention can be used both for indoor and outdoor applications. The compositions according to the invention permit to obtain coatings suitable for use as a single layer coating or as one or more layers in a multi-layer system. The coating often is a top coat, though the radiation curable compositions of the invention can also be used for the making of primer and/or sealers and/or topcoat. The (top) coating can be transparent or opaque. Opaque coatings are for instance applied on the backing of mobile phones and/or other electronic devices. Compositions of the invention are also highly suitable in the car industry such as for the coating of head lamps, trim pieces, the coating of compositions and/or plastic materials used in the automotive industry.

For coatings on plastics, a dead matt effect is often combined with haptic properties and/or a soft feel that can be created by the addition of organic additives and matting agents like (DECOSILK™, DECOSOFT™ available from Microchem).

Both topcoats, sealers and/or primers can be prepared from the compositions according to the invention. Coatings can be pigmented and/or clear coats. Primers are in general easily sandable. Topcoats advantageously combine a matt effect with an excellent scratch and/or stain resistance. Sealers prepared from radiation curable compositions according to the invention in general allow a high pigment load.

The need for less matting agents (d) translates into improved rheology characteristics, better transparency, deeper curing and stain and scratch resistance performance similar to that of high gloss systems.

Matting compositions (II) of the invention are particularly suited for the making of coatings. Compositions of the invention, however, may also be used for the making of an ink, overprint varnish, adhesive and/or a molded article. Another aspect of the invention hence concerns a coating, ink, overprint varnish, adhesive and/or molded article made from or comprising at least one radiation curable composition according to the invention.

One particular embodiment of the invention relates to a coating prepared from a radiation curable composition according to the invention.

Further provided in the invention is also a process for the coating of an article or a substrate, said process comprising the steps of:

(i) applying a radiation curable composition of the invention to at least one surface of an article or a substrate,
(ii) followed by a step of radiation curing the coating to give a matt coating having a gloss level of at most 15 at 60° angle and at most 50 at 85° angle at a cured film thickness of 12 µm. An advantage of using the compositions of the invention is that this gloss level can be obtained or coatings that have a dry thickness (cured film thickness) of from 6 to 120 µm. The matting effect is thus obtainable over a wide variety of coating thicknesses.

Further provided is a coating obtained from a composition according to the invention or via a process according to the invention.

There is also provided a coated substrate comprising a coating that comprises a composition according to the present invention; and a use of a coating composition according to the invention, for coating a substrate comprising steps of application of the coating composition to the substrate to form a coating followed by radiation curing the coating to give a matt coating having a gloss measurement of at most 15 at 60° angle and at most 50 at 85° angle at a cured film thickness of 12 µm. There is also provided a matt coating prepared by coating a substrate with a composition (II) of the invention, said matt coating having a gloss measurement of at most 15 at 60° angle and at most 50 at 85° angle at a cured film thickness of 12 µm. An advantage of using the compositions of the invention is that this gloss level can be obtained or coatings that have a cured film thickness of 6-120 µm. The matting effect is thus obtainable over a wide variety of coating thicknesses. Throughout the invention, gloss at 60° and 85° angle have been measured using a BYK Gardner micro-TRI-gloss 20-60-85 gloss-meter in accordance with DIN-67530.

Coatings containing the matt extender (I) of the invention, tend to have a better soft feel, and those designed for wood substrates exhibit enhanced transparency. The new binder also does not negatively influence the flexibility or hardness of the coating. As a result the matt extender (I) of the invention is ideal for use in top coatings and self-sealing coatings.

The invention will now be described in more details in the examples below, which in no way are intended to be limited. Throughout the invention and in particular in the examples the following measuring methods have been applied.

Materials and Methods

Uv Curing:

Curing was done in the following way: 6-120 µm thick coating layers were applied on Leneta paper opacity cards with a bar coater. Coatings were then cured under UV lights at a cure speed of 5 m/min using 40, 80 or 120 Watt/cm$^2$ Hg lamps.

Gloss Measurements:

Throughout the invention and also here gloss measurements were done with a BYK Gardner micro TRI-gloss 20-60-85 gloss-meter in accordance with DIN-67530.

Stain Resistance:

Test Conditions:

A coating of 80µ dry is applied by bar coater on a white Leneta paper. Coatings were then cured under UV lights at a cure speed of 5 m/min using 80 Watt/cm$^2$ Hg lamps. After irradiation the sample is stabilized in a conditioned room (20° C., 50% RH) for at least 1 hour.

Evaluation:

Stain resistance is measured as described A product (Z) is put on the coating for a certain period of time (Y) and covered with a glass capping to prevent air drying. After time (Y) the product (Z) will be removed with a tissue drenched in solvent (S) or a water/soap solution. The following products were tested (Table 1):

TABLE 1

| Z | Y | S |
| --- | --- | --- |
| black marker (Artline 70N) | 5 minutes | IPA |
| eosine | 16 hours | H$_2$O/detergent |
| Iso-betadine | 16 hours | H$_2$O/detergent |
| Ethanol/water (50/50) | 24 hours | Dry wipe |
| Red Wine | 24 hours | H2O/detergent |
| Coffee | 24 hours | H2O/detergent |
| NH3 (10%) | 24 hours | H2O |
| Mustard | 24 hours | H2O/detergent |

A scale from 1 to 5 is then used as following to determine and score the stain resistance:

5 No visual stain
4 Very light stain
3 Moderate stain
2 Strong stain
1 Very strong stain Chemical Resistance:

This method determines if a dry film is resistant to a specific solvent.

Test Conditions:

A coating of 80µ dry is applied by bar coater on a white Leneta paper. Coatings were then cured under UV lights at a cure speed of 5 m/min using 80 Watt/cm$^2$ Hg lamps. After irradiation the sample is stabilized in a conditioned room (20° C., 50% RH) for at least 1 hour.

Evaluation:

A coating (X) is put for a certain period of time (Y) in contact with a solvent (Z). The different products tested are 10% NH3, 10% NaOH, 50% Ethanol (diluted in water), water, iso propyl alcohol and acetone. Afterwards the appearance is evaluated. Also the appearance is scored visually as: intact, soluble, gloss variation, adhesion failure etc.

A scale from 1 to 5 is then used as following to determine and score the chemical resistance:

1 No visual stain
2 Very light stain
3 Moderate stain
4 Strong stain
5 Very strong stain Cone and Plate Viscosity: according to ISO 3219

Thermo-Stability:

Where need the sample is made homogeneous prior to starting the test. A 30 ml bottle is then filled with the sample leaving only the neck not filled. The sample is then put into an oven at the appropriate temperature and time. Every day there is a check on gel formation: by turning the sample upside down once to see if the sample has gelled. After the prescribed test time, the sample is removed from the oven, and checked for gels. If the sample contains gels, then the test is stopped. Two aging tests are typically run: 10 days at 60° C. (140° F.) and 10 days at 80° C. (176° F.). Noted is the number of days until the sample has gelled.

Examples Section:

Matt Extenders (I) of the Invention Lower the Gloss, Even without Addition of Matting Agents (d)

Compositions of the invention were compared with standard matt coatings that contain silica as matting agent (EX1-R). Coatings were applied onto black Leneta paper using a bar coater followed by UV curing under 80 Watt/cm$^2$ Hg lamps. Dry thickness of the coatings was 10-20-40-80 µm respectively. The composition of the coatings and gloss levels at 60° and 85° angle respectively are given in Table 2. Also the stain resistance & the chemical resistance were evaluated. Amounts unless otherwise indicate are given in parts.

The data of Table 2 show that coatings prepared from matt extenders of the invention exhibit a lower gloss (EX2-3). With the addition of (extra) standard matting agents gloss levels below 5 at 60° angle can be reached ("dead matt effect"). Stain and chemical resistance are not negatively impacted by the addition of metal soaps (b).

TABLE 2

|  | EX1-R* | EX2 | EX3 |
| --- | --- | --- | --- |
| Urethane acrylate (UA) | 21 | 21 | 21 |
| Polyester acrylate (PEA) | 21 | — | — |
| Matt extender ** | — | 20 | 20 |
| HDDA | 42 | — | 42 |
| DPGDA | — | 42 | — |
| ACEMATT ® TS 100 | 2 | — | 2 |
| SYLOID ™ 162C | 8 | — | 8 |
| IRGACURE ™ 1173 (PI) | 2 | 2 | 2 |
| ADDITOL ® BP (PI) | 2 | 2 | 2 |

|  | Standard matting recipe | Example without silica matting agents | Example with silica matting agents |
| --- | --- | --- | --- |
| C&P Viscosity 25° C. in mPas | 486 | 227 | 927 |
| Reactivity (120 W Hg) 10 µm | 20 m/min | 20 m/min | 15 m/min |

| | | Dry thickness in µm | | | | | | | | | | |
| --- | --- | --- | --- | --- | --- | --- | --- | --- | --- | --- | --- | --- |
| | | 10 | 20 | 40 | 80 | 10 | 20 | 40 | 80 | 10 | 20 | 40 | 80 |
| Gloss levels on black Leneta sheet | 60° | 8.4 | 8.8 | 7.3 | 7.1 | 13.5 | 12.6 | 13.7 | 13 | 3.6 | 2.5 | 2 | 1.8 |
| | 85° | 21.8 | 32.1 | 29.1 | 20.8 | 38.9 | 32.1 | 35.9 | 30.8 | 20.5 | 24.2 | 29.6 | 24.6 |

| Stain & Chemical Resistance at 5 m/min | | | |
| --- | --- | --- | --- |
| Mustard | 2 | 3 | 4 |
| 2% Eosine | 2.5 | 2.5 | 1.5 |
| Coffee | 4 | 4 | 3 |
| Iso-betadine | 2.5 | 2.5 | 1.5 |
| NH$_3$ 10% | 4 | 4 | 4.5 |
| Ethanol 50% | 5 | 5 | 5 |
| N70 Marker | 2.5 | 2.5 | 2 |
| Average | 3.2 | 3.3 | 3.1 |

*Without matting agents the gloss at 60° angle would be over 90
** PEA/Zinc stearate/additive (85/14/1). The PEA is the same as the one of EX1-R
HDDA: hexanediol diacrylate, DPGDA: dipropyleneglycol diacrylate Matting Below 15 can be Reached by Adding Standard Inorganic Matting Agents (d)

A whole range of inorganic silica matting agents (d) was tested on their compatibility with the "matt extenders" of the invention. Coatings with a dry thickness of 10-20-40-80 μm respectively were applied by a bar coater onto black Leneta paper. Coatings were then cured under UV lights at a cure speed of 5 m/min using 120 Watt/cm² Hg lamps. The coating's composition is given in Table 3 and the results are summarized in Table 4.

The data of Table 4 show that gloss levels at 60° C. below 10 can be reached with the standard silicas. Even gloss levels below 5 can be easily reached.

TABLE 3

|  | pbw |
| --- | --- |
| Matt extender* | 20 |
| Urethane acrylate | 30 |
| DPGDA | 42 |
| ADDITOL ® BP (PI) | 3 |
| IRGACURE ™ 1173 (PI) | 2 |
| Silica matting agents | ++ |

*PEA/Zinc stearate/additive (85/14/1)

TABLE 4

| | | | EX4 | EX5 | EX6 | EX7 | |
| --- | --- | --- | --- | --- | --- | --- | --- |
| | | | \multicolumn{4}{c}{60° Gloss at dry thickness} | |
| Silica | pbw | Viscosity (25° C.) | 10 μm | 20 μm | 40 μm | 80 μm | |
| | | | \multicolumn{4}{c}{60° Gloss} | |
| CP4-8991 | 10 | 3180 | 1.5 | 1.1 | 0.9 | 1.1 | A |
| ACEMATT ™ 3300 | 5 | 2000 | 2.4 | 2 | 1.6 | 1.4 | B |
| ACEMATT ™ 3600 | 10 | 1570 | 2.5 | 1.9 | 1.7 | 1.5 | C |
| GASIL ™ EBN | 10 | 600 | 6.5 | 7.3 | 7.1 | 4.4 | D |
| SYLOID ™ 162C | 10 | 860 | 5.7 | 5.8 | 4.7 | 4.5 | E |
| ACEMATT ™ TS 100 | 5 | 2390 | 2.4 | 2 | 1.9 | 1.4 | F |
| SYLOID ™ 162C | 5 | 1280 | 4 | 3.7 | 3.1 | 2.4 | G |
| SYLOID ™ CP 4-8991 | 5 | | | | | | |
| SYLOID ™ 162C | 5 | 1370 | 4 | 3.1 | 2.7 | 2 | H |
| GASIL ™ EBN | 5 | | | | | | |
| GASIL ™ EBN | 5 | 2650 | 2.9 | 2.1 | 2 | 1.6 | I |
| ACEMATT ™ 3300 | 5 | | | | | | |
| GASIL ™ EBN | 7 | 1580 | 3.9 | 3.4 | 2.9 | 2.3 | J |
| ACEMATT ™ 3300 | 3 | | | | | | |
| GASIL ™ EBN | 8 | 1350 | 4.5 | 4.3 | 3.8 | 3 | K |
| ACEMATT ™ 3300 | 2 | | | | | | |

Matting Below 15 can be Obtained Using Less Silica Matting Agents

Coatings with a dry thickness of 20 μm were applied by a bar coater on a black Leneta paper. Coatings were then cured under UV lights at a cure speed of 5 m/min using 120 Watt/cm² Hg lamps. Gloss at 60° angle and the Cone-Plate Viscosity at 23° C. were measured. The coating's composition is given in Table 5 and the results are summarized in Table 6.

TABLE 5

|  | pbw |
| --- | --- |
| Matt extender* | 20 |
| Urethane acrylate | 30 |
| DPGDA | 42 |
| ADDITOL ® BP (PI) | 3 |

TABLE 5-continued

|  | pbw |
| --- | --- |
| IRGACURE ™ 1173 (PI) | 2 |
| Silica matting agents | ++ |

*PEA/Zinc stearate/additive (85/14/1)

TABLE 6A

| | \multicolumn{6}{c}{Viscosity (Cone&Plate) at 23° C.} |
| --- | --- | --- | --- | --- | --- | --- |
| | EX8 | EX9 | EX10 | EX11 | EX12 | EX13 |
| Pbw silica addition | 1.25 | 2.5 | 3.75 | 5 | 7.5 | 10 |
| GASIL ™ EBN | | 300 | | 375 | 478 | 600 |
| SYLOID ™ 162C | | 316 | | 459 | 690 | 860 |
| ACEMATT ™ TS 100 | 395 | 760 | 1250 | 2390 | | |
| CP4 8991 | | 515 | | 870 | 2010 | 3180 |
| ACEMATT ™ 3300 | 360 | 820 | 1200 | 2000 | | |

TABLE 6B

60° Gloss on black Leneta paper

|  | EX8 | EX9 | EX10 | EX11 | EX12 | EX13 |
|---|---|---|---|---|---|---|
| Pbw silica addition | 1.25 | 2.5 | 3.75 | 5 | 7.5 | 10 |
| GASIL ™ EBN |  | 10.3 |  | 8.7 | 7 | 7.3 |
| SYLOID ™ 162C |  | 9 |  | 7.5 | 6.2 | 5.8 |
| ACEMATT ™ TS 100 | 8.7 | 5.4 | 3.1 | 2 |  |  |
| CP4 8991 |  | 6.9 |  | 3.4 | 1.9 | 1.1 |
| ACEMATT ™ 3300 | 9.4 | 4.7 | 2.8 | 2 |  |  |

Matting Below 10 can be Reached by Adding Standard Organic Matting Agents (d)

Coatings with a dry thickness of 10-20-40-80 μm thickness were applied by a bar coater onto black Leneta paper. Coatings were then cured under UV lights at a cure speed of 5 m/min using 120 Watt/cm$^2$ Hg lamps. Gloss at 60° angle and Gloss at 85° angle were measured. The coating's composition is given in Table 7 and the results are summarized in Table 8.

TABLE 7

|  | pbw |
|---|---|
| Matt extender* | 20 |
| Urethane acrylate | 30 |
| DPGDA | 42 |
| ADDITOL ® BP (PI) | 3 |
| IRGACURE ™ 1173 (PI) | 2 |
| Matting agents | ++ |

*PEA/Zinc stearate/additive (85/14/1)

TABLE 8

The effect of adding wax additives

|  | 2 pbw Wax additives ||||||||||
|  | Silica 1/3 TS100 |  | 2/3 EBN 60° Gloss |||| Viscosity 85° Gloss ||||
|  |  |  | Dry thickness (μm) ||||||||
|  | Amount | Viscosity | 10 | 20 | 40 | 80 | 10 | 20 | 40 | 80 |
|---|---|---|---|---|---|---|---|---|---|---|
| — | — | 275 | 13.5 | 12.6 | 13.7 | 13 | 38.9 | 32.1 | 35.9 | 30.8 |
| LANCO ™ 1930 | — | 324 | 12.9 | 11.5 | 11.9 | 11.7 | 32.4 | 29.2 | 29.4 | 26.6 |
| LANCOWAX ™ PP 1362 D | — | 320 | 11.6 | 9.9 | 10.5 | 10 | 31.6 | 26.6 | 27.2 | 22.8 |
| SASOLWAX ™ 5413 | — | 300 | 13.2 | 12.8 | 14.3 | 12.9 | 41 | 32.5 | 37 | 31 |
| LANCO ™ 1930 | — | 2835 | 3.1 | 2.4 | 2.4 | 2 | 18.9 | 22.9 | 31.4 | 27.4 |
| LANCOWAX ™ PP 1362 D | — | 3020 | 3.2 | 2.6 | 2.4 | 1.9 | 19.2 | 24.6 | 30.9 | 23.3 |
| SASOLWAX ™ 5413 | 10 | 1610 | 4 | 3.2 | 3 | 2.6 | 19.5 | 20.3 | 27.6 | 24.6 |
| LANCO ™ 1930 | 10 | 1990 | 4.1 | 3.5 | 3.2 | 2.5 | 19.6 | 23.4 | 27 | 21.6 |
| LANCOWAX ™ PP 1362 D | 10 | 1810 | 4.1 | 3.2 | 3 | 2.3 | 20.6 | 21.3 | 26.7 | 23.5 |
| SASOLWAX ™ 5413 | 8 | 2330 | 3.1 | 2.5 | 2.2 | 1.9 | 18.5 | 23.3 | 29.9 | 25.7 |

LANCO ™ 1930: Synthetic wax
SASOLWAX ™ 5413: Paraffine
LANCOWAX ™ PP 1362 D: Modified polypropylene Testing of Different Zinc Compounds in a Topcoat Coatings with a dry thickness of 80 μm thickness were applied by a bar coater onto black Leneta paper. Coatings were then cured under UV lights at a cure speed of 7 m/min using 2×80 Watt/cm$^2$ Hg lamps. Gloss at 60° measurements were repeated after 2 weeks of shelf life. The topcoat composition is given in Table 9. Results are summarized in Table 10. Initially all Zn catalysts had some levels of matt extension, but this effect is gone after 12 days of storage of the mixture (see e.g. Comparative Examples 17R and 18R) unless matt extenders of the invention were used. In that case the matt effect stayed and the hardness of the coating stayed good. The best balance of properties is obtained with matt extenders (I) of the invention (see e.g. Example 19). Comparative Example 17-R shows that the length of the fatty acid plays a role.

TABLE 9

| | pbw |
|---|---|
| Urethane acrylate | 30 |
| DPGDA | 42 |
| ADDITOL ™ BP (PI) | 3 |
| IRGACURE ™ 1173 (PI) | 2 |
| SYLOID ™ 162C | 8 |
| ACEMATT ™ TS 100 | 2 |
| LANCO ™ PP 1362 D | 2 |

TABLE 10

| | EX16-R | EX17-R | EX-18R | EX19 |
|---|---|---|---|---|
| Formulation | Reference | +5 pbw Zn-Octoate | +5 pbw Zn-Acrylate | +20 pbw Matt extender* |
| Gloss 60° | 21.1 | 13.1 | 12.2 | 8.7 |
| PERSOZ hardness | 147 | 121 | 159 | 138 |
| Gloss 60° ** | 20.3 | 34.2 | 30.2 | 8.6 |

*PEA/Zinc stearate/additive (85/14/1),

** Repeat after 2 weeks shelf-life of the mixtures

Matting Effect Together with Good Mechanical and Chemical Properties

A DC coating was applied on sealed wood (EBECRYL® 8332). A topcoat was applied in the amount of from 8 to 15 g/m2. Coatings were then cured under UV lights at a cure speed of 2×7 m/min using 80 Watt/cm² Hg lamps. Cure speed and mechanical properties were investigated (Table 11). Matting agents of the invention have a clear benefit over other agents used in the art like ODA (octyl decyl acrylate) (Table 12). In Table 13 different matt extenders according to the invention are compared (EX26-35).

TABLE 11

| | | EX20-R | EX21 |
|---|---|---|---|
| Urethane acrylate | | 21 | 21 |
| Polyester acrylate | | 21 | — |
| DPGDA | | 40 | 40 |
| ODA** | | — | — |
| Matt extender* | | — | 20 |
| ACEMATT ™ OK 520 | | 8 | 8 |
| IRGACURE ™ 1173 | | 2 | 2 |
| ADDITOL ® BP | | 2 | 2 |

| | | Standard recipe | Matt extender |
|---|---|---|---|
| C&P Viscosity 25° C. in mPas | | 1020 | 2510 |
| Reactivity (120 W Hg) 10 μm | | 15 m/min | 15 m/min |
| Gloss on wood 60° | Perpendicular with ribs | 11.8 | 7.3 |
| | Parallel with ribs | 15.1 | 8.2 |
| 85° | Perpendicular with ribs | 26.7 | 16.4 |
| | Parallel with ribs | 51.8 | 33.6 |
| Coin test | | pass | pass |
| Hamberger | | >38N | 29N |
| Ericksen pen | | 16N | 13N |
| Steel wool | | pass | pass |
| Stain & Chemical Resistance 5 m/m | Mustard | 2 | 3 |
| | 2% Eosine | 3 | 2 |
| | Coffee | 5 | 5 |
| | Iso-betadine | 2 | 2 |
| | NH₃ 10% | 5 | 5 |
| | Ethanol 50% | 5 | 5 |
| | N70 Marker | 3.5 | 4 |
| | Average | 3.6 | 3.7 |

*PEA/Zinc stearate/additive (85/14/1);

**ODA: octyl decyl acrylate

TABLE 12

| | | EX22-R | EX23-R | EX24-R | EX25 |
|---|---|---|---|---|---|
| Urethane acrylate | | 30 | 30 | 30 | 30 |
| Polyester acrylate | | 10 | 10 | 10 | 10 |
| DPGDA | | 42 | 42 | 42 | 42 |
| ODA | | — | 10 | 20 | — |
| Matt extender* | | — | — | — | 20 |
| SYLOID ™ 162C | | 8 | 8 | 8 | 8 |
| ACEMATT ™ TS100 | | 2 | 2 | 2 | 2 |
| LANCO ™ PP 1362 | | 2 | 2 | 2 | 2 |
| IRGACURE ™ 1173 | | 3 | 3 | 3 | 3 |
| ADDITOL ® BP | | 2 | 2 | 2 | 2 |

| | | Standard recipe | ODA | ODA | Matt Extender |
|---|---|---|---|---|---|
| Gloss on wood 60° | Perpendicular with ribs | 13-14 | 6-7 | 5-7 | 11.5 |
| | Parallel with ribs | 15-18 | 9-13 | 9-14 | 12.5-13 |
| 85° | Perpendicular with ribs | 35-39 | 11-15 | 15-18 | 26-33 |
| | Parallel with ribs | 70-71 | 40-54 | 43.5-44 | 58-63 |
| Coin test (ranking) | | 1 | 3 | 4 | 1 |
| Hamberger in N (Newton) | | >38 N | 25 N | 20 N | >38 N |
| Ericksen pen in N (Newton) | | 18 N | 21 N | 15-18 N | 18-21 N |
| Steel wool: 50 DR + 1 kg weight | | pass | fails | fails | pass |
| Stain & Chemical | Mustard | 3 | 3 | 3 | 4 |

TABLE 12-continued

| | | | | | |
|---|---|---|---|---|---|
| Resistance 5 m/m | 2% Eosine | 3 | 2 | 2 | 3 |
| | Coffee | 5 | 4 | 4 | 5 |
| | Iso-betadine | 2 | 2 | 2 | 3 |
| | NH$_3$ 10% | 5 | 4 | 4 | 5 |
| | Ethanol 50% | 5 | 5 | 5 | 5 |
| | N70 Marker | 4 | 4 | 3 | 3 |
| | Average | 3.9 | 3.7 | 3.7 | 4.0 |

*PEA/Zinc stearate/additive (85/14/1)

TABLE 13

| Binder | Metal soap | % load | 10 days T° aging stability 60° | 10 days T° aging stability 80° C. | Matt Extender in SPF F7.2 * | DC on Leneta paper Gloss 80 μm wet 20° | DC on Leneta paper Gloss 80 μm wet 60° | DC on Leneta paper Gloss 80 μm wet 85° | 24 Hrs stain test ETOH 50% | 24 Hrs stain test Red wine |
|---|---|---|---|---|---|---|---|---|---|---|
| PEA (4f) | Zn-Stearate - Univar | 28 | OK | OK | 10 pbw | 0.5 | 5.6 | 28.5 | 5 | 5 |
| EA in diluent | | | OK | 5 days | | 0.5 | 5.4 | 22.0 | 5 | 5 |
| TMP(OE)4TA | | | OK | OK | | 0.4 | 3.8 | 19.9 | 5 | 5 |
| PEA | | | OK | OK | | 0.5 | 5.8 | 28.1 | 5 | 5 |
| TMP(OE)4TA | Ca-Stearate Ceasit - Baerlocher | 28 | OK | OK | 10 pbw | 1.9 | 9.5 | 23.6 | 5 | 5 |
| | Zn-stearate PS - Baerlocher | | OK | OK | | 2.4 | 13.6 | 42.1 | 5 | 5 |
| PEA (4f) | Al-Stearate - FACl | 20 | — | — | 20 pbw | 1.3 | 11.7 | 35.9 | — | — |
| | Ca-Stearate DW - FACl | | — | — | | 0.8 | 8.4 | 34.8 | 4 | 4 |
| | Ca-Stearate S - FACl | | — | — | | 0.9 | 8.7 | 29.1 | 4 | 4 |
| | Li-Stearate - FACl | | — | — | | 0.5 | 5.7 | 24.0 | — | — |

| Binder | | DC on Leneta paper 24 Hrs stain test coffee | DC on Leneta paper 24 Hrs stain test NH$_3$ 10% | DC on Leneta paper 24 Hrs stain test 2% Eosine | DC on Leneta paper 24 Hrs stain test Mustard | Gloss 60° at different thicknesses wet 80μ | Gloss 60° at different thicknesses wet 40μ | Gloss 60° at different thicknesses wet 24μ | Gloss 60° at different thicknesses wet 12μ | EX |
|---|---|---|---|---|---|---|---|---|---|---|
| PEA (4f) | Zn-Stearate - Univar | 5 | 3 | 2 | 3 | 8.0 | 6.8 | 7.6 | 7.7 | 26 |
| EA in diluent | | 4 | 3 | 2 | 3 | 6.0 | 5.7 | 7.5 | 7.2 | 27 |
| TMP(OE)4TA | | 3 | 3 | 2 | 3 | 5.5 | 6.0 | 6.8 | 5.8 | 28 |
| PEA | | 4 | 3 | 2 | 3 | 5.5 | 5.4 | 6.5 | 6.2 | 29 |
| TMP(OE)4TA | Ca-Stearate Ceasit - Baerlocher | 5 | 4 | 2 | 3 | 3.1 | 3.3 | 4.4 | 5.0 | 30 |
| | Zn-stearate PS - Baerlocher | 5 | 4 | 2 | 3 | 5.7 | 6.9 | 6.8 | 6.3 | 31 |
| PEA (4f) | Al-Stearate - FACl | — | — | — | — | 11.0 | 11.7 | 12.7 | 10.6 | 32 |
| | Ca-Stearate DW - FACl | 4 | 4 | 2 | 3 | 7.3 | 7.4 | 8.6 | 8.3 | 33 |
| | Ca-Stearate S - FACl | 4 | 4 | 2 | 3 | 7.5 | 7.2 | 7.5 | 8.0 | 34 |
| | Li-Stearate - FACl | — | — | — | — | 5.4 | 4.7 | 4.9 | 4.1 | 35 |

— Not tested
* Composition - see Table 9
PEA: Polyester acrylate,
EA: Epoxy acrylate

The invention claimed is:

1. A radiation curable matting composition (II) comprising:
   from 2 to 40 wt % of a radiation curable composition (I) consisting essentially of:
   (a) from 70 to 90 wt % of one or more (meth)acrylated compounds containing from 2 to 10 (meth)acryloyl groups per molecule,
   (b) from 10 to 30 wt % of one or more metal salts selected from the group consisting of calcium stearate, lithium stearate, and zinc stearate, and
   (c) from 0 to 10 wt % of one or more of compounds different from (a) and (b),
       wherein a total wt % of compounds (a), (b) and (c) is 100 wt % of the composition (I), and
       wherein the one or more of compounds (c) is at least one member selected from the group consisting of heat stabilizers, defoamers, leveling agents, wetting agents, dispersing agents, anti-cratering agents, sedimentation inhibitors, UV absorbers, antioxidants, and matting agents different from compounds (a) and (b); and
   optionally, from 0 to 20 wt % of one or more matting agents (d), different from compounds (b),
   wherein after curing by radiation a matt coating is obtained with a gloss level of at most 15 at 60° angle and at most 50 at 85° angle at a cured film thickness of 12 μm, and
   wherein an amount of a mono-functional alkyl(meth)acrylate in the matting composition (II) is less than 8 wt %.

2. The matting composition (II) of claim 1, wherein the amount of compounds (b) in the matting composition (II) is from 0.1 to 20 wt %, relative to the total weight of the matting composition (II).

3. The matting composition (II) of claim 1, wherein the amount of matting agents (d) in the matting composition (II) is from 0.5 to 15 wt %, relative to the total weight of the matting composition (II).

4. The matting composition (II) of claim 1, wherein the matting agents (d) are at least one selected from the group consisting of silica and waxes.

5. A process for making the radiation curable matting composition (II) of claim 1, said process comprising the steps of:
   (i) providing the radiation curable composition (I),
   (ii) optionally adding matting s agents (d),
   (iii) optionally adding further (meth)acrylated compounds, and
   (iv) optionally, adding additives and/or solvents,
   wherein steps (i), (ii), (iii) and (iv) may be in any order.

6. A process for the coating of an article or a substrate, said process comprising the steps of:
   (i) applying the radiation curable matting composition (II) according to claim 1 to at least one surface of an article or a substrate,
   (ii) followed by a step of radiation curing the coating
   to give a matt coating having a gloss measurement of at most 15 at 60° angle and at most 50 at 85° angle at a cured film thickness of 12 μm.

7. A substrate obtained by the process according to claim 6, wherein the substrate is at least one selected from the group consisting of wood, plastic, films and foils.

8. A coating, ink, overprint varnish or an adhesive prepared from the radiation curable matting composition (II) according to claim 1.

9. A cured film comprising the radiation curable matting composition (II) according to claim 1, which has a thickness between 6 and 120 μm, and a gloss level of at most 50 at 60° angle and at most 80 at 85° angle.

10. The matting composition (II) of claim 1, wherein the mono-functional alkyl(meth)acrylate in the matting composition (II) is a $C_8$-$C_{20}$ mono-functional alkyl(meth)acrylate.

11. The matting composition (II) of claim 1, wherein the amount of the mono-functional alkyl(meth)acrylate in the matting composition (II) is less than 5 wt %.

12. The matting composition (II) of claim 10, wherein the amount of the mono-functional alkyl(meth)acrylate in the matting composition (II) is less than 5 wt %.

* * * * *